April 27, 1954     W. J. PODBIELNIAK     2,676,914
MOVABLE THERMOCOUPLE FOR DETERMINING AND CONTROLLING
THE LOCATION OF THE VAPOR CONDENSATION
RING IN A FRACTIONATING COLUMN
Filed June 24, 1952     2 Sheets—Sheet 1
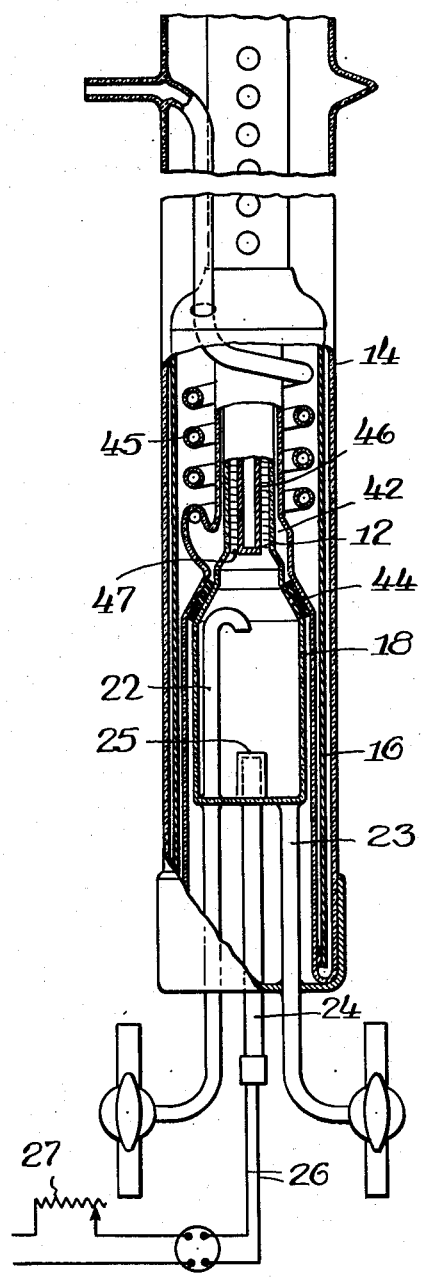
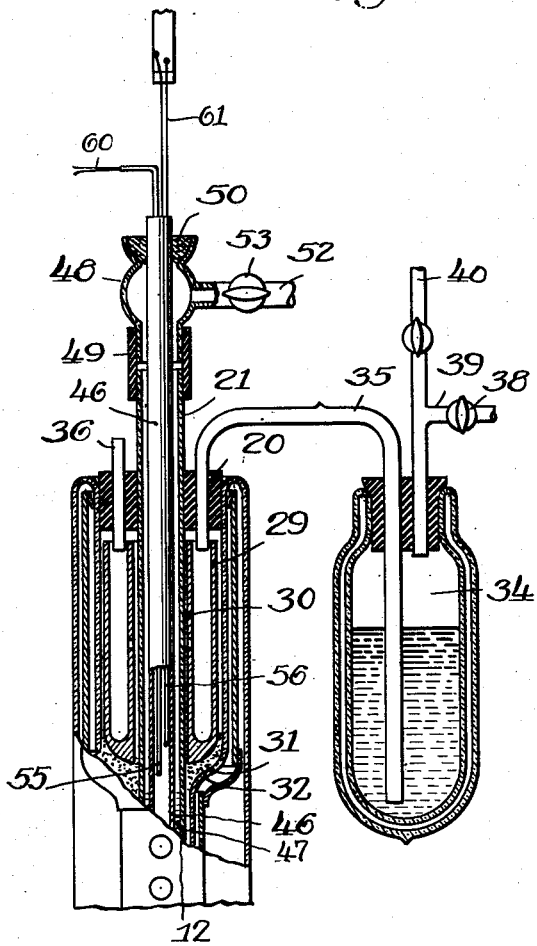
Inventor,
Walter J. Podbielniak,
By: Schneider & Dressler,
Attys.

April 27, 1954
W. J. PODBIELNIAK
2,676,914
MOVABLE THERMOCOUPLE FOR DETERMINING AND CONTROLLING
THE LOCATION OF THE VAPOR CONDENSATION
RING IN A FRACTIONATING COLUMN
Filed June 24, 1952
2 Sheets-Sheet 2
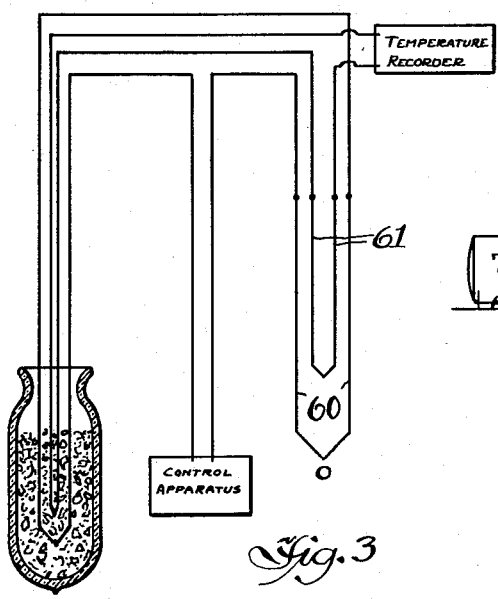
Fig. 3
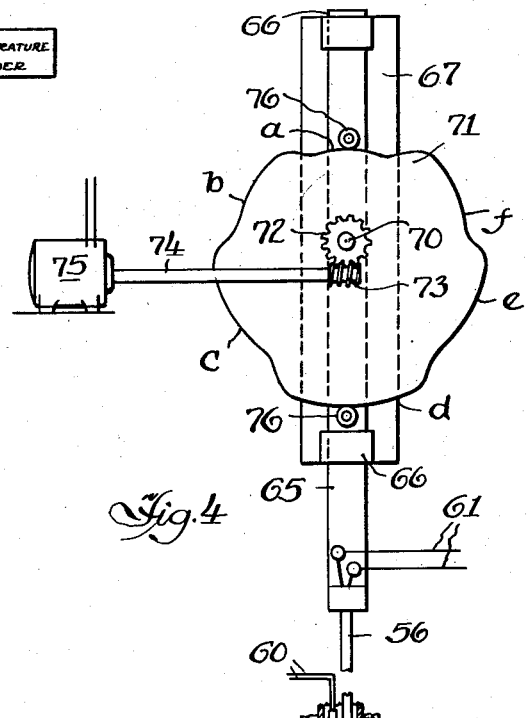
Fig. 4
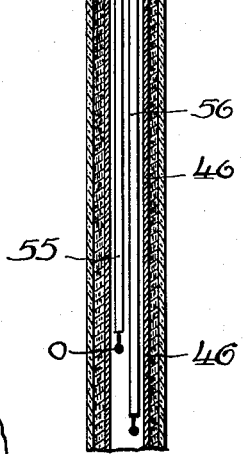
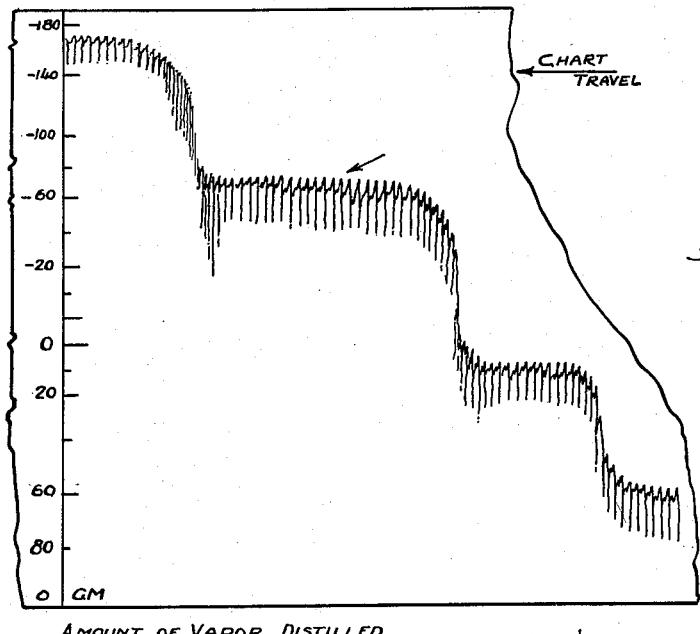
Fig. 5
Inventor,
Walter J. Podbielniak
By: Schneider & Dressler,
Attys.

Patented Apr. 27, 1954

2,676,914

UNITED STATES PATENT OFFICE 2,676,914

MOVABLE THERMOCOUPLE FOR DETERMINING AND CONTROLLING THE LOCATION OF THE VAPOR CONDENSATION RING IN A FRACTIONATING COLUMN

Walter J. Podbielniak, Chicago, Ill., assignor of one-half to Wladzia G. Podbielniak Application June 24, 1952, Serial No. 295,220

6 Claims. (Cl. 202—160)

1

This invention relates to improvements in the apparatus for the analytical fractionation of volatile liquids and of gases or vapors containing condensible liquid fractions. The fractionating column of this invention is an improvement over those disclosed in my Patents Nos. 1,917,272, granted July 11, 1933; 2,275,648, granted March 10, 1942; and 2,342,366, granted February 22, 1944, and is a modification of the invention disclosed in my prior application Serial No. 598,380, filed June 8, 1945, now Patent No. 2,602,046, granted July 1, 1952.

In the fractionating columns of the prior art, particularly the low temperature fractionating columns used to obtain precise fractional distillations for analytical purposes, a single thermocouple is usually positioned in a fixed location in the reflux portion of the column to indicate the condensing temperature of the vaporous products leaving the column. This location is approximately at the region of the uppermost vapor condensation ring in the sample being distilled and, therefore, the thermocouple supposedly indicates the temperature of the vapor leaving the column.

It is very difficult to stabilize the location of this vapor condensation ring. It has been found that this ring tends to wander above and below the usual fixed location single thermocouple, with changing column conditions, over a range of as much as 2 to 3 inches, depending on the sharpness of the break between the constituents of the sample being distilled, the distillation rate, etc. Because of this no single stationary thermocouple can follow all "breaks" accurately, with the result that the liquid boiling point temperature readings are not uniformly accurate. While error in temperature recordings due to the wandering of this condensation ring can be minimized by close control of the operating conditions of the column, it cannot be entirely eliminated and it crops up in most analysis results, especially in the case of small percentages of the lowest boiling component, as of propane, for example, in a cracked C4 fraction, etc. Since a low-temperature column may operate on very small samples, a shift or wandering of the condensation ring of as little as about ½ inch may represent a change in the supposedly constant holdup above the thermocouple of about 6 cc. of vapor, or a possible error of about 0.1 to 0.3% depending on the size and composition of the sample.

Up to the present time the attempts to stabilize the wandering condensation ring to remove this error have not given satisfactory results. In accordance with the present invention I have found a positive solution to this problem in the use of a movable thermocouple together with means for holding it successively at predetermined locations spaced at about ⅜ inch intervals in the reflux portion of the column to encompass the maximum usual wandering of the uppermost vapor condensation ring. A conventional, fixed location, independent thermocouple may be used in the fractionating column of my invention, as before, to control the rate of distillation; the other movable thermocouple in accordance with the present invention, however, is used in connection with a temperature recorder, preferably a highly sensitive temperature recorder such as an electronic potentiometer recorder, and with other apparatus, to yield a multiple record of temperature against pressure, thereby obtaining a temperature-pressure distillation curve of the sample undergoing distillation, as described in my above-mentioned patents and in my Patent No. 2,009,814, granted July 30, 1935. This curve (Fig. 5) is in the form of a wide band or ribbon and the upper edge (indicated by the arrow) of the band-like curve is the locus of the lowest reflux temperature, no matter at which position of the movable thermocouple it may occur, and correctly follows the temperature at the uppermost liquid condensation ring.

The fractionating column of my invention will be readily understood from the following detailed description of an illustrative embodiment thereof shown in the drawings in which the conventional fixed location thermocouple to control the rate of distillation is included with a movable thermocouple which is movable to encompass the range of the wandering of the uppermost vapor condensation ring, as hereinafter described. It is, of course, to be understood that my invention is not to be construed as limited to the details of the illustrative embodiment since these details may be varied without departing from the scope of my invention as defined in the appended claims.

Reference is made to the accompanying drawings wherein:

Figure 1 is an enlarged detailed, broken longitudinal section through the lower portion of an illustrative fractionating column, with parts in elevation and broken away to show the column packing;

Fig. 2 is a similar view of the upper portion of the column, showing the arrangement of the thermocouple embodying the novel feature of my invention;

Fig. 3 is a diagrammatic representation of the thermocouples shown in Fig. 2 and of the connections of the thermocouples to suitable control and recording devices;

Fig. 4 is a fragmentary view, partly in elevation and partly in section, showing means for successively positioning the movable thermocouple at predetermined positions in the reflux portion of the column; and Fig. 5 is an illustrative temperature-pressure distillation curve of a sample distilled with the column of the present invention in accordance with the procedures described in my above-mentioned patents; the exact sequence and location of the recorded individual temperatures not being precisely drawn.

Referring more particularly to the drawings, there is shown a fractionating column which, except for the additional, movable thermocouple provided in accordance with the present invention, is substantially similar to the column shown in my Patent No. 2,275,648. While the present invention is illustrated in connection with a preferred fractionating column, it is not limited thereto since the movable thermocouple may be incorporated in any analytical fractionating column, in the columns of my prior patents above referred to, for example.

The fractionating column structure illustrated comprises a distilling tube 12 surrounded by an evacuated jacket member 14, both formed of a low expansion heat-resistant glass such as "Pyrex," or other suitable material, and a metallic reflector member 16 which is mounted between the spaced walls of the jacket member and which extends substantially throughout the length thereof. The lower end of the distilling tube is enlarged to form a distilling bulb 18 and the upper end of the tube extends through a stopper 20 of rubber or rubber-like material, which plugs the opening at the top of the column, and out through the column as at 21. A sample inlet tube 22 of glass or other suitable material extends into the bulb 18, and a tube 23 of similar material serves to establish communication between the bulb and a mercury bottle (not shown) and between the bulb and a graduated receiver (not shown), as fully described in my Patent No. 2,342,366.

Heat may be supplied to the sample in the bulb by means of a metal-clad, cartridge-type electric resistance heater 24 which extends into an "off-centered" glass heater well 25 formed in the bottom of the bulb. The current supply wires 26 of the heating element lead to a conventional rheostat 27 which may be controlled to regulate accurately the heat input. Obviously, any other suitable heating means may be employed for this purpose.

In the upper portion of the column, immediately beneath stopper 20, a double-walled annular metallic vessel 29 surrounds tube 12 and is spaced therefrom as at 30. The vessel is supported in the position shown by a suitable insulating material such as glass wool 31 which surrounds the tube and rests on a shoulder 32 formed in the inner wall of vacuum jacket 14. Liquid air is introduced into vessel 29 from a Thermos bottle 34 through a vacuum-jacketed, silvered tube 35 which extends through stopper 20 and into the mouth of the vessel 29. The liquid air serves to cool the vessel and, in turn, tube 12 to condense vapors therein and provide reflux. The liquid air vaporized in the vessel is vented through a tube 36 which extends from the vessel through the stopper. The supply of liquid air to the vessel may be manually controlled, as by a hand-operated valve 38 in a compressed air supply line 39 leading to a suitable compressor; or it may be controlled automatically as described in my Patent No. 2,275,648. A valve-controlled vent tube 40 is provided to vent the compressed air from Thermos bottle 34 to the surrounding space.

In the operation of the fractionating column shown herein, the vaporized liquid air circulates in the vessel 29 and then escapes through vent 36. In the event it is desired to circulate liquid air vapors throughout the length of the tube during operation in accordance with the present invention, vent 36 may be plugged or even dispensed with and openings provided in the wall of vessel 29 adjacent the tube to establish communication between the vessel and space 30. The vaporized liquid air will then flow through space 42 between tube 12 and the inner wall of vacuum jacket 14 to the bottom thereof, formed by plug or gasket 44, and then out through vent tube 45.

So much of the fractionating column described above is substantially similar to the fractionating column shown and described in my Patent No. 2,275,648.

The effective length of the distilling tube which may be used in accordance with the present invention may be in the order of about 48" to about 60" and its internal diameter in the order of about preferably, 6.3 mm. to 8 mm., for low boiling point samples which are usually distilled in low-temperature fractionating columns. For samples which are normally liquids at room temperature, considerably larger tubes may be employed, for example, tubes having an internal diameter even up to about 1", or more if found desirable. The relatively large diameter tubes in accordance with the present invention, either for low boiling point or high boiling point samples, are necessary in order to accommodate a tube core 46 having a packing 47 wrapped around it.

Tube core 46, of stainless steel or other corrosion resistant alloy, is suspended from a hollow globular-shaped glass member 48 which may be removably joined in an air-tight fit to portion 21 of tube 12 by a suitable rubber connection 49. The tube core extends axially through member 48 and is secured and sealed thereto, as by a cement joint or plug 50 which attaches the tube core adjacent its open end to the walls of member 48. As shown in the drawings, tube core 46 extends throughout the length of tube 12 and its closed lower end terminates approximately at the juncture between the tube and distilling bulb 18.

Tube core 46 may have, for example, an outside diameter in the order of about 6 to 8 mm. and the wall thereof a thickness, for example, in the order of about 0.005 inch to 0.010 inch. Before inserting tube core 46 into tube 12, the packing 47 is wound about the tube core and the composite structure so formed is inserted into the tube. The method of making this packing is described in my Patent No. 2,332,110, granted October 19, 1943. As is manifest from the drawing, packing 47 extends between a point slightly below the cooling vessel 29 and the top of distilling bulb 18, but it may extend upwardly in the tube to any desired extent.

Packing 47 may be, suitably, in the form of a coil or coils of small wires, or of a closely spaced wired structure, as in my Patent No. 2,275,648, or it may have any other suitable form. I prefer.

however, that the packing be in the form described and claimed in my Patent No. 2,332,110, and particularly as shown in Fig. 23 of that patent. The preferred form of packing in accordance with my invention may be wound about the tube core and inserted in the tube and then treated to form the packing, all as described in my Patent No. 2,332,110. The packing serves to bring about a more extended and intimate surface contact of the downwardly flowing reflux liquid with the vapors rising from the distilling bulb. The packing of my Patent No. 2,332,110 is preferred because it appears to be the most effective packing for bringing about this extended and intimate contact of liquid and vapors.

Under normal conditions of distillation, the vapors rising out of the distillation tube are permitted to pass continuously through the hollow portion of member 48 surrounding the tube, then to a line 52 for disposition or collection, as desired. For example, line 52 may be connected to a manifold and, in turn, to an automatic distillation control apparatus as described in my Patents Nos. 1,967,258 and 2,275,648. A manually operated valve 53 in line 52 is provided to enable the operator to close in the column so that it operates under total reflux and establishes equilibrium conditions within the column. This is a desirable procedure to follow before initiating distillation.

The condensing temperature of the vaporous product leaving the column during distillation has been indicated and the rate of distillation controlled in the past, as in my above-mentioned patents, by a thermocouple located in the reflux portion of the column at the approximated position of the uppermost portion of the liquid condensation ring. A similar thermocouple 55 within tube core 46, with its junction "O" in the same approximate position, may be used in the column of my present invention, but only, however, to control the rate of distillation. The condensing temperature of the vaporous product is indicated and determined by means of an additional independent thermocouple 56 movable to a number of positions, suitably spaced at about 3/8 inch intervals, preferably above and below thermocouple position "O," to encompass the maximum usual wandering of the vapor condensation ring. In the drawings, means are provided whereby the junction point of movable thermocouple 56 may be caused to assume cyclically six such positions, some above and some below that of thermocouple junction "O." It is to be understood that the number of such positions to be assumed by the junction of the movable thermocouples may be increased or decreased, as desired, but there must be a minimum of three such positions. The conventional, fixed location thermocouple junction "O" is preferably located in the approximate center of the usual range of travel of the wandering vapor condensation ring, and in the embodiment of the drawings it is located at a level corresponding to an intermediate point in the travel of the movable, independent thermocouple; however, junction "O" may be otherwise positioned in the region of the wandering condensation ring.

Each of the thermocouples 55 and 56 are of the conventional single-junction type and consists, for example, of a copper wire and a constantan wire for low-temperature operations, and of other suitable metals for high-temperature operations. The free ends or leads of the thermocouples extend outwardly from the tube core and are connected to the terminals of recording potentiometers. The thermocouple leads 60 (Fig. 3) from junction "O" of couple 55 are connected in the conventional manner to a distillation control apparatus, as in my Patent No. 2,275,648, for example, and the rate of distillation may be controlled by this thermocouple as described in this patent, for example. The thermocouple leads 61 from the movable thermocouple 56 are connected to an independent potentiometer recorder, preferably a very sensitive instrument such as an electronic potentiometer recorder, which serves to record, successively and cyclically the temperatures at the different positions which the junction of movable thermocouple 56 is caused to take.

In Fig. 4 of the drawings, suitable means are illustrated for reciprocating the movable thermocouple 56 and for positioning it in a number of positions above and below the thermocouple position O and at the same time to permit a sufficient dwell of the thermocouple at each position to permit the thermocouple to come to the ambient temperature and permit the same to be properly recorded.

As illustrated, the movable thermocouple 56, which projects upwardly from the interior of the metallic core tube 46, is secured at its end to a reciprocable slide 65 which is mounted in guides 66, supported on a plate 67 which may be mounted on any suitable supporting means. A shaft 70 projects forwardly from a suitable bearing in plate 67 through a slot (not shown) in slide 65 and carries a cam 71 and also a gear 72, by which the cam 71 is rotated through a worm gear 73 mounted on shaft 74 driven by synchronous motor 75. The motor 75 is driven at a rate such as to cause a slow rotation of the cam 71, say 1 or 2 R. P. M. The cam 71 is provided with a succession of cam surfaces designated by letters $a$, $b$, $c$, $d$, $e$ and $f$, each occupying a substantial radial angle, say approximately 50°. The slide 65 is provided with rollers 76, which engage the cam surfaces and thereby cause vertical movement of the slide and of the thermocouple 56 as the cam is rotated. Between each of the successive cam surfaces $a$ to $f$, the cam surface is curved to permit easy movement of the rollers from each arcuate surface to the next. In the form of cam shown, the arcuate surfaces $b$ and $f$ are the same radial distance from the center of the cam, as are the arcuate surfaces $c$ and $e$. As the cam rotates, the thermocouple therefore dwells at four positions in the reflux condensing zone of the column, these positions being determined by the radial distances of the arcuate surfaces $a$ to $f$ of the cam from its center. As is readily apparent, the radial distances of the arcuate surfaces on cam 71 may be varied, as may the number and radial angles thereof, to provide for the desired number and positions of the junction of thermocouple 56 during each cycle or complete rotation of the cam.

In Fig. 5 there is shown a typical distillation curve of a cracked $C_4$ sample run at about 300 mm. absolute pressure, as obtained with the fractionating column of my invention operated, for example, in accordance with the teachings of my Patent No. 2,275,648. This curve is a continuous record of the E. M. F. of the movable copper-constantan thermocouple in its different positions, each recorded consecutively for a ten second interval, for example, against the pressure rise in the distillate receivers (not shown), as described in my Patent No. 2,275,648. The locus of the lowest temperatures recorded during each cycle (which is one minute in the illustrative case) against the pressure rise in the distillate receiver may be considered to be the correct distillation curve. This is the envelope on the left side of the curve, or, as viewed in the drawing with the arrow pointing to the left, the top of the curve. The distance between the left hand envelope and right hand envelope of the curve, measured perpendicularly to the direction of chart travel on the recording device, is approximately the "spread" of the recording for the different positions of the thermocouple or the difference between the lowest and highest temperature recorded during one complete cycle of movement of the thermocouple.

In the hereinabove described illustrative embodiment of my invention, a fixed location, independent thermocouple is used to control the rate of distillation. The use of this fixed location thermocouple is not essential, however. If there is no automatic control of the distillation rate by a thermocouple the column may be operated at a fixed rate, or a variable rate dependent on the judgment of the operator.

In a low temperature fractionating column the vapors above the uppermost vapor condensation ring almost immediately superheat from thermal conduction from room temperature and, therefore, the uppermost vapor condensation ring is the lowest temperature in the column reflux zone. The same situation may exist in many designs of high temperature fractionating columns where the product boiling point is above room temperature, but portions of the column reflux above the normal uppermost vapor condensation ring are higher than the product boiling point, thus leading to superheating of vapor above the uppermost vapor condensation ring. In consequence, by providing three or more temperature recording positions for the independent thermocouple in the region of the condensing temperature of the vapors leaving the column and encompassing the range of the wandering of the uppermost vapor condensation ring, I am enabled to obtain a more nearly accurate record of the temperature of the uppermost vapor condensation ring by taking the readings of the lowest temperature position, whichever it may be, than by following the readings of any one fixed location thermocouple or a group of fixed location thermocouples arranged in parallel.

I claim:

1. In apparatus for precise fractionation, a fractionating column having a reflux condensing zone including a varying minimum temperature point of vapor condensation, a thermocouple movable to at least three spaced positions within said reflux condensing zone in the region of said minimum temperature point, means for moving said thermocouple cyclically in succession to each of such positions, and means for recording the temperatures indicated by said thermocouple at its various positions to thereby determine and record the minimum temperature within said reflux condensing zone.

2. In apparatus for precise fractionation, a fractionating column having a reflux condensing zone including a varying minimum temperature point of vapor condensation, a fixed thermocouple within said zone, means operable from said fixed thermocouple for controlling the rate of distillation within said column, a thermocouple movable to at least three spaced positions within said reflux condensing zone in the region of said minimum temperature point, means for moving said thermocouple cyclically in succession to each of such positions, and means for recording the temperatures indicated by said thermocouple at its various positions to thereby determine and record the minimum temperature within said reflux condensing zone.

3. In precise fractionation apparatus, a fractionating column, means for applying cooling adjacent the top of said column to form a reflux condensing zone at the upper portion of said column, said zone including a varying minimum temperature point of vapor condensation, a fixed thermocouple within said zone in the region of said minimum temperature point, means operable from said fixed thermocouple to control the cooling means, thereby controlling the rate of distillation from said column, a movable thermocouple capable of being cyclically and successively positioned at each of a plurality of points within the reflux condensing zone in proximity to said control thermocouple including points above and below it, and means for recording the temperatures indicated by said movable thermocouple to thereby determine the minimum temperature within said reflux condensing zone in proximity to said control thermocouple.

4. In apparatus for determining and recording conditions in analytical distillation apparatus having a fractionating column supplied with vapors at its lower end and cooled at its upper end, with vapor exit means at its upper end, said column having near its upper end a minimum temperature point of vapor condensation susceptible of variation within a limited region, a thermocouple vertically movable within the region of variation of said minimum temperature point, means for recording the temperatures indicated by said movable thermocouple, means for reciprocating said movable thermocouple and for causing said thermocouple in its reciprocating movement to dwell at a plurality of points within said region of variation of the minimum temperature point, said points of dwell of said movable thermocouple including points above and below the position of said control thermocouple, whereby the temperatures at the dwell points of said thermocouple are successively and cyclically recorded and the minimum temperature within said region of variation ascertained and indicated.

5. In apparatus for determining and recording conditions in analytical distillation apparatus having a fractionating column supplied with vapors at its lower end and cooled at its upper end, with vapor exit means at its upper end, said column having near its upper end a minimum temperature point of vapor condensation susceptible of variation within a limited region, a fixed thermocouple in said region of variation of the minimum temperature point, means operable from said fixed thermocouple for controlling the rate of distillation from said column, a thermocouple vertically movable within the region of variation of said minimum temperature point, means for recording the temperatures indicated by said movable thermocouple, means for reciprocating said movable thermocouple and for causing said thermocouple in its reciprocating movement to dwell at a plurality of points within said region of variation of the minimum temperature point, said points of dwell of said movable thermocouple including points above and below the position of said control thermocouple, whereby the temperatures at the dwell points of said thermocouple are successively and cyclically recorded and the minimum temperature within said region of variation ascertained and indicated.

6. In apparatus for determining and recording conditions in analytical distillation apparatus having a fractionating column supplied with vapors at its lower end and cooled at its upper end, with vapor exit means at its upper end, said column having near its upper end a minimum temperature point of vapor condensation susceptible of variation within a limited region, a thermocouple vertically movable within the region of variation of said minimum means for reciprocating said vertically movable thermocouple including a slide member to which said thermocouple is secured, a rotatable cam having a plurality of circular arcuate surfaces unequally spaced from the center of rotation of the cam, and means on said slide cooperating with said cam whereby, on rotation of the cam, the said movable thermocouple is caused to assume successively and to dwell at points in said region of variation of the minimum temperature point in the column corresponding to the arcuate surfaces on said cam, and means for continuously recording the temperatures indicated by said movable couple to thereby ascertain and record the minimum temperature within said region.

References Cited in the file of this patent

UNITED STATES PATENTS

| Number | Name | Date |
| --- | --- | --- |
| 1,968,534 | Megow | July 31, 1934 |
| 2,275,648 | Podbielniak | Mar. 10, 1942 |
| 2,588,748 | Niles et al. | Mar. 11, 1952 |
| 2,602,046 | Podbielniak | July 1, 1952 |

OTHER REFERENCES

McMillan: Journal of Inst. of Petroleum Technologists, vol. 22, 1946, pages 640, 641.